United States Patent [19]
Abraham

[11] Patent Number: 5,249,434
[45] Date of Patent: Oct. 5, 1993

[54] SYSTEM AND METHOD FOR AUTOMATIC CHARGING OF REFRIGERATION SYSTEMS

[75] Inventor: Anthony W. Abraham, Arlington, Tex.

[73] Assignee: Wynn's Climate Systems, Inc., Fort Worth, Tex.

[21] Appl. No.: 908,396

[22] Filed: Jul. 6, 1992

[51] Int. Cl.$^5$ .............................................. F25B 45/00
[52] U.S. Cl. ........................................ 62/292; 62/149
[58] Field of Search ........................... 62/292, 149, 77

[56] References Cited

U.S. PATENT DOCUMENTS

| | | | |
|---|---|---|---|
| 3,686,954 | 8/1972 | Motl | 62/149 X |
| 4,470,265 | 9/1984 | Correia | 62/77 |
| 4,513,578 | 4/1985 | Proctor et al. | 62/149 |
| 4,688,388 | 8/1987 | Lower et al. | 62/126 |

Primary Examiner—albert J. Makay
Assistant Examiner—William C. Doerrler
Attorney, Agent, or Firm—Paul W. O'Malley, Jr.

[57] ABSTRACT

A refrigeration system servicing apparatus includes a digital controller, a vessel for storing and pressurizing refrigerant, a solenoid actuated valve responsive to the digital controller for selective connection of the refrigeration system to a vacuum source, a solenoid actuated valve responsive to the digital controller for connection of the vessel to the refrigeration system, a pressure sensor for providing pressure readings to the digital controller from the low pressure side of the vacuum source, a pressure sensor for providing pressure readings to the digital controller from the vessel and means for quantifying the refrigerant in the Vessel. Three operational modes provided for are: a "vacuum" mode, during which residue material in the refrigeration system is boiled away; a "charge oil" mode, during which lubricant is added to the refrigeration system; and a "charge refrigerant" mode, during which refrigerant is added to a refrigeration system. During vacuum mode the refrigeration system may be subjected to a pressure integrity test. Where in an inadequate vacuum is developed the error condition is signalled and the service technician is given opportunity to attempt correction. If a sufficient vacuum is developed, but cannot be held within a certain range for a minimum period the error condition is signalled and the service technician is again given opportunity to correct the condition, or to abort the operation.

8 Claims, 13 Drawing Sheets

SYSTEM AND METHOD FOR AUTOMATIC CHARGING OF REFRIGERATION SYSTEMS

BACKGROUND OF THE INVENTION

1. Field of the Invention

The invention relates to servicing of refrigeration systems and more particularly to a system and method for automatically cleaning, testing and charging a refrigeration system used for cooling of an automobile passenger compartment.

2. Description of the Prior Art

Most refrigeration systems used for air cooling employ one of a class of substances known as refrigerants as a working fluid. A refrigerant is used to transport heat. The temperature of any compressible fluid rises with compression and falls with decompression. Refrigeration systems (or any heat pump) use cycles of alternating compression and decompression of their working fluid, occurring at mutually spaced locations, to transport heat from one location to another. Where compression of the working fluid raises its temperature above the ambient temperature, heat can be passed from the fluid to the environment. The quick loss of heat is facilitated by the passing the compressed working fluid through a heat exchanger. As compression of the working fluid is lost, the fluid falls in temperature. When the temperature falls below that of the environment, the working fluid can be passed through a second heat exchanger allowing it to absorb heat from the environment. By moving the working fluid between the two heat exchangers the system transports heat from the second heat exchanger to the first heat exchanger. By sealing the environments in which the heat exchangers are located off from one another, the environment housing the second heat exchanger can be cooled.

Refrigerants are those compressible fluids which are particularly efficient at transporting heat. Where used for maintaining a comfortable "room temperature", they should be good at transporting heat in a range around room temperature. They should remain in a compressible state well below the freezing point of water. Atmospheric air does not make for a particularly efficient refrigerant. Water vapor makes such a poor refrigerant as to be considered a serious contaminant if found in the working fluid of a refrigeration system.

Refrigeration systems are sealed against the incursion of air and water vapor, and against the loss of refrigerant, to prevent reduction in the efficiency of the system. However, refrigeration systems can leak, losing working fluid to the atmosphere, and gaining contaminants from the atmosphere. Therefore the compression/decompression cycle of refrigeration systems must occasionally be opened to allow replacement of the working fluid.

Replacement of the refrigerant in a refrigeration system requires replacement both of the refrigerant and a system lubricant. The greater the purity of the new refrigerant and lubricant is kept, the better. During servicing, purity is achieved by as complete as possible a cleaning of the refrigeration system before introduction of the new refrigerant and lubricant. After initial discharge of the old material from the refrigeration system, nearly complete cleaning is achieved by putting the refrigeration system under a vacuum. Liquid residue, particularly water, is vaporized under vacuum and withdrawn by a vacuum pump. Thereafter, pressurized refrigerant and lubricant are forced into the evacuated refrigeration system.

U.S. Pat. No. 4,688,388 to Lower et al. describes a automated system for charging a refrigeration system. As described in the '388 patent, a microprocessor based controller controls the sequence and duration of the application of vacuum and the introduction of oil and refrigerant to a refrigeration system. Solenoid actuated valves are used to selectively connect a vacuum pump and reservoirs of refrigerant and lubricating oil, to the compression/decompression cycle. Duration of the vacuum is timed. The period of connection of the lubricant and refrigerant reservoirs is determined by changes in weight of the contents of the reservoirs, as measured by a scale on which the reservoirs rest.

Programming of the charging apparatus taught in the '388 patent by an operator is aided by provision of a numeric keypad and other control keys, through which selection of, a given mode of operation, e.g. vacuum mode, may be made, duration of the vacuum mode may be made, or quantity of refrigerant may be made. Information relating to charging system status and error conditions are provided on an output display.

However, the '388 patent does not teach incorporation of tests useful in detecting fault conditions of the refrigeration system. Such faults may have contributed to contamination of the old working fluid. The '388 patent also fails to monitor conditions within the recharging system which compromise or prevent carrying out a recharging operation.

SUMMARY OF THE INVENTION

It is therefore one object of the invention to provide an improved system and method for charging a refrigeration system.

It is another object of the invention to provide a system and method for testing a refrigeration system during cleaning and charging.

The foregoing objects are achieved as is now described. The invention provides a system and method for contemporaneous testing of a refrigeration system during vacuum cleaning and charging. A refrigeration system servicing apparatus includes a digital controller, a vessel for storing and pressurizing refrigerant, a solenoid actuated valve responsive to the digital controller for selective connection of the refrigeration system to a vacuum source, a solenoid actuated valve responsive to the digital controller for connection of the vessel to the refrigeration system, a pressure sensor for providing pressure readings to the digital controller from the refrigeration system, a temperature sensor for providing temperature readings to the digital controller from the vessel and means for quantifying the refrigerant in the vessel.

Lubricant is mixed with the refrigerant inside the refrigeration system during charging. Lubricant is provided under pressure from a second pressurized vessel to the refrigeration system by a solenoid actuated valve controlled by the digital controller. The quantity of lubricant in the vessel and its pressure are measured for use by the digital controller.

A user input/output interface connected to the digital controller allows the service technician to select an operational mode of the servicing apparatus. Those modes are: a "vacuum" mode, during which residue material in the refrigeration system is boiled away; a "charge oil" mode, during which lubricant is added to the refrigeration system; and a "charge refrigerant"

mode, during which refrigerant is added to a refrigeration system. During vacuum mode the refrigeration system may be subjected to a pressure integrity test. Where an inadequate vacuum is developed the error condition is signalled and the service technician is given opportunity to attempt correction. If a sufficient vacuum is developed, but cannot be held within a certain range for a minimum period the error condition is signalled and the service technician is again given opportunity to correct the condition, or to abort the operation.

During either oil or refrigerant charging mode, measurements are taken to assure that material is passing from the respective oil and refrigerant pressurization vessels to the refrigeration system being serviced. Pressurization is provided by heating the materials and can be determined by calculation based upon the quantity of material in the vessels and the temperature of the material.

The present invention is directed to service apparatus for air conditioning equipment, particularly automobile air conditioning. The use of chlorofluorocarbon refrigerants (CFCs) is, at the time this is being written, being phased out in favor of hydrofluorocarbon refrigerants (HFCs). Additionally, tight regulation on the discharge of refrigerants to the atmosphere have been put into place. The impetus for these changes is the identification by some environmental scientists of CFCs as contributing to degradation of the ozone layer of the atmosphere upon their release to the atmosphere. As a result of this imminent change in air conditioning refrigerants, service equipment must be adapted to handle substitution of HFCs for CFCs when existing equipment is serviced.

Substitution of HFC refrigerant for CFC refrigerant (rather than simple addition of HFC to a CFC system) is required because of compatibility concerns. While the favored types of CFC and HFC for use in automobiles do not react with each other, they do form an azeotrope. An azeotrope is a mixture of liquids or gases analogous to an alloy. An azeotrope acts like a single compound, having physical and chemical properties different than either of its two components. At certain concentration ratios, the favored types of HFC and CFC for automobile applications form a high-pressure (low-boiling point) azeotrope. This means that the vapor pressure for the azeotrope is higher than it is for either of the component refrigerants. For a variety of reasons this is an undesirable condition. One reason is a requirement of the Environmental Protection Agency that air conditioning systems be leak free and that no venting of refrigerants occur. Higher than anticipated vapor pressure makes it more likely that a refrigeration unit will be vented. Further, azeotropes are typically hard to separate, making recycling difficult. Further, CFCs are imcompatible with lubricating oils used with some HFCs. The chlorine in CFC can react with the oils resulting in instability of the entire system, lubricant degradation, sludge formation and subsequent early failure of an refrigeration unit.

The testing regimen provides high assurance of refrigeration system pressure integrity and high assurance of elimination of volatile components from within a system undergoing servicing. It may be noted that vacuum degradation may be caused by a system leak of the slow vaporization of residual impurities, such as lubricating oil or CFC contaminated water. If no leak can be found the use of cleansing materials may be required to clear a system of residual impurities. This helps present the possible problems caused by the uninformed addition of an HFC refrigerant to the refrigeration system without first removing CFCs from the system.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
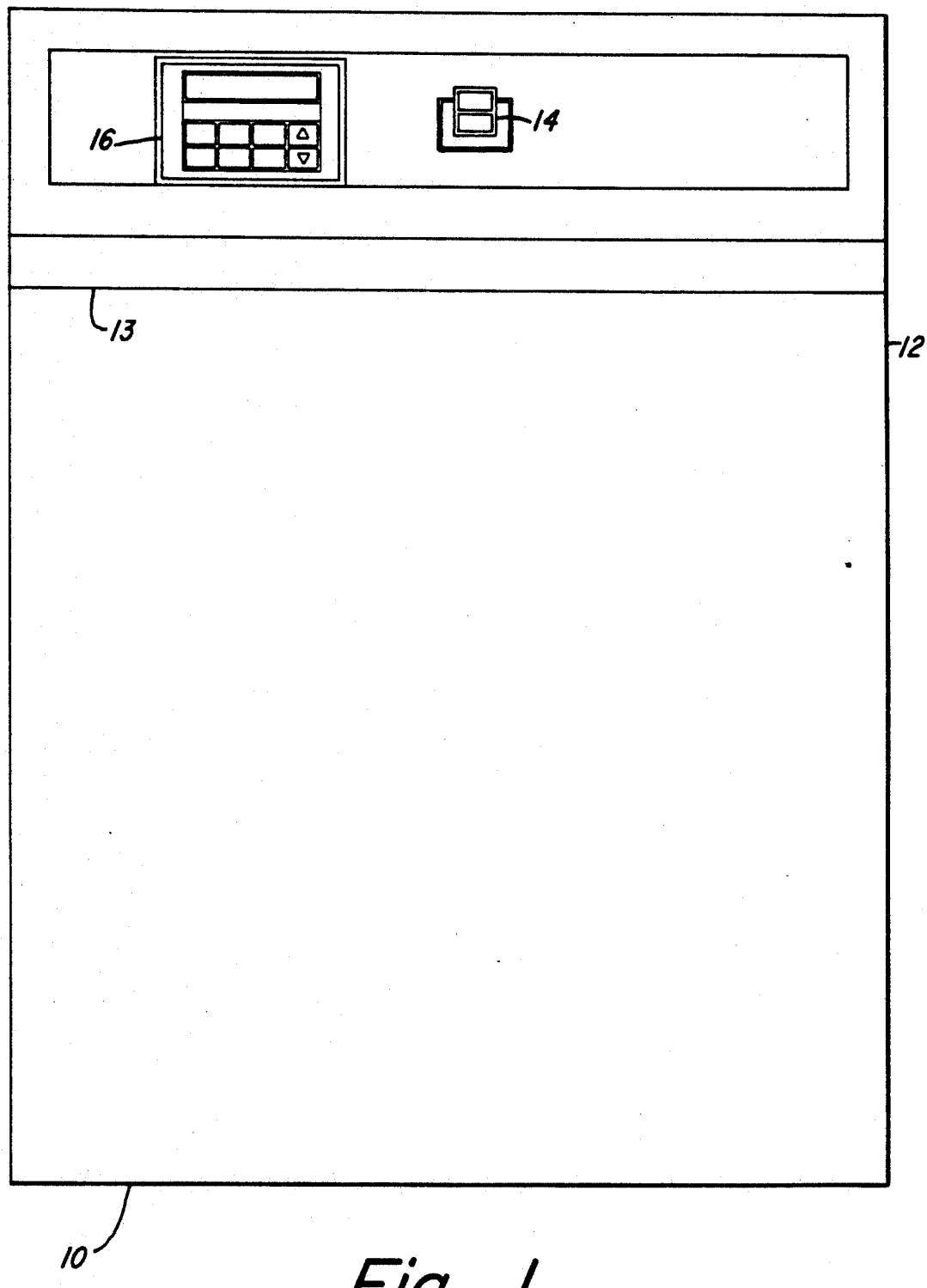
FIG. 1 is a front plan view of a housing with instrument panel for a refrigeration system servicing system.
Figure 2:
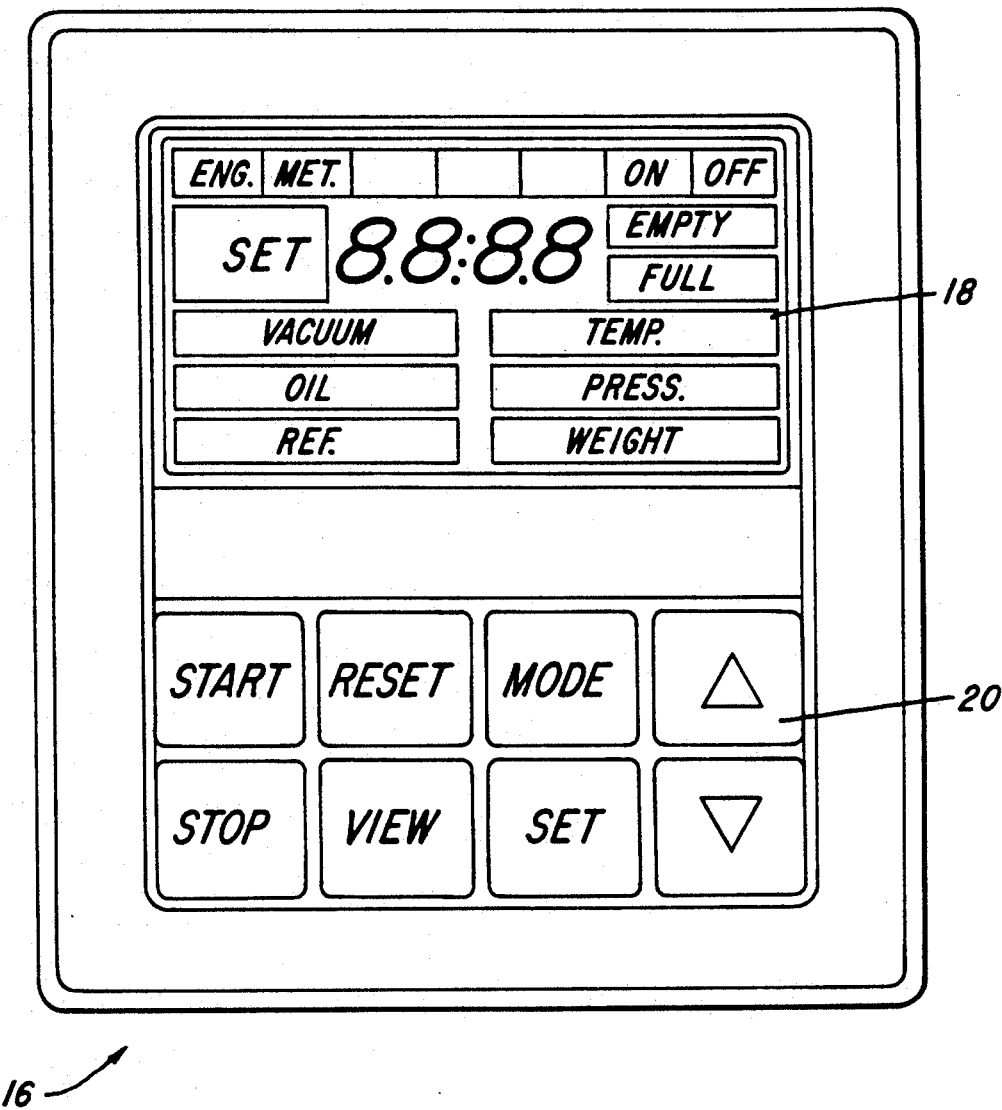
FIG. 2 is a plan view of an input/output interface for the refrigeration system servicing system.

With reference now to the figures and in particular with reference to FIGS. 1 and 2, there is depicted a refrigeration system servicing apparatus having a housing 12. Supported on the upper part of housing 12 is a control panel 13 having an ON/OFF switch 14 and an input/output interface 16. Interface 16 includes a liquid crystal display 18 and a keypad 20 Display 18 identifies whether the system is on or off, and indicates which of three modes of operation (i.e. vacuum, oil charging, or refrigerant charging) has been invoked, if any. Display 18 further indicates whether english or metric units of measurement are being used. Display of the temperature of the refrigerant or oil, the pressure differences between the refrigeration system undergoing recharging and ambient pressure, and the weight of material to be used in charging the system is on a numerical display and specified by highlighting an appropriate label. The central numerical display of display 18 may also be used to indicate time remaining in a mode.

Keypad 20 includes up and down toggle switches for selecting modes or selecting pressure, temperature or weight for display and for changing the numerical display. Start and stop switches allow manual initiation of tasks. The function of a Reset button is explained below. The mode button allows the user to use the toggle buttons to select one of the three modes and a view button allows the user to toggle between display of temperature, pressure or weight. The set key serves as an enter key.

Figure 3:
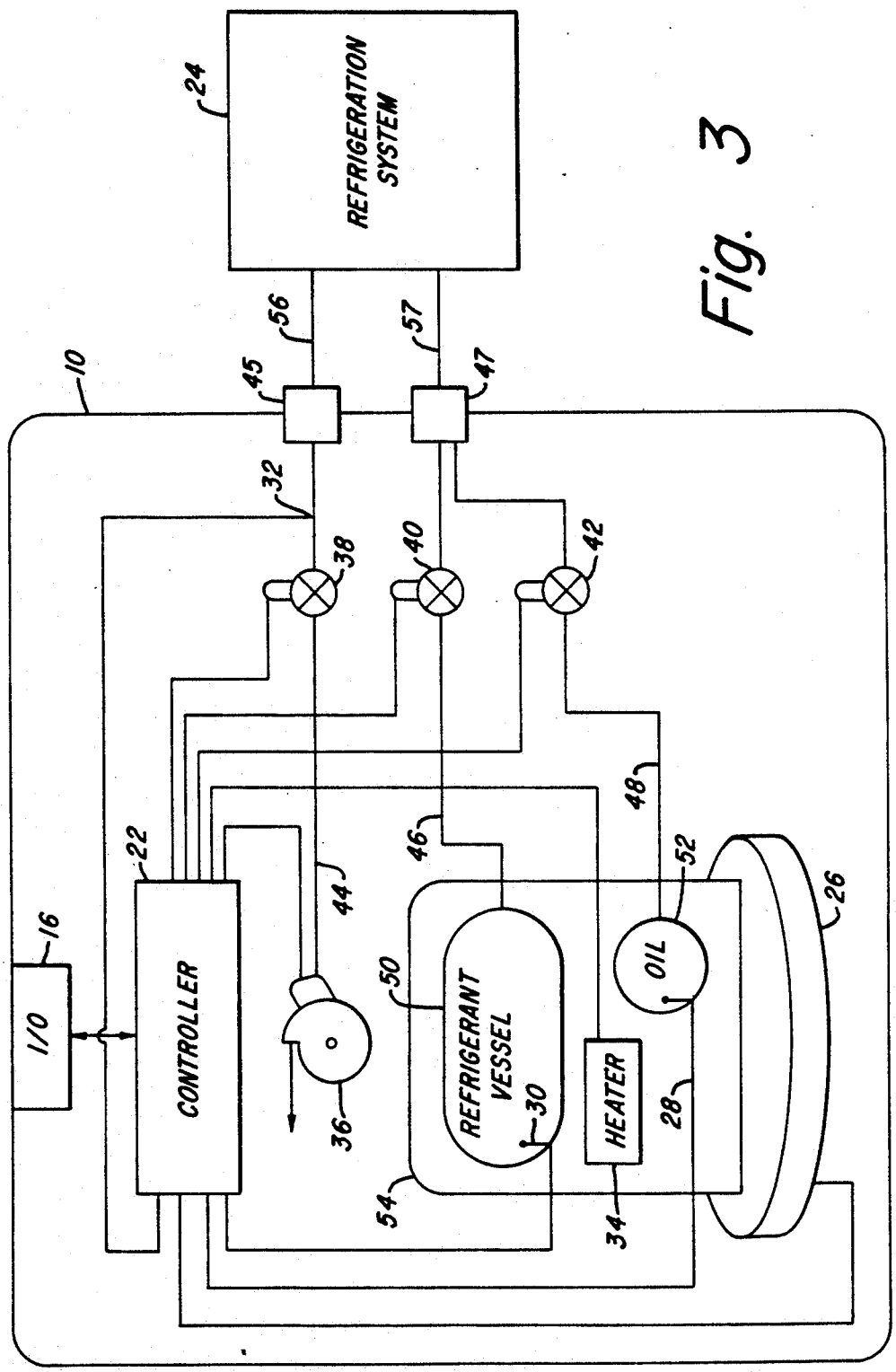
FIG. 3 is a schematic illustration of the refrigeration system servicing system.
Figure 4:
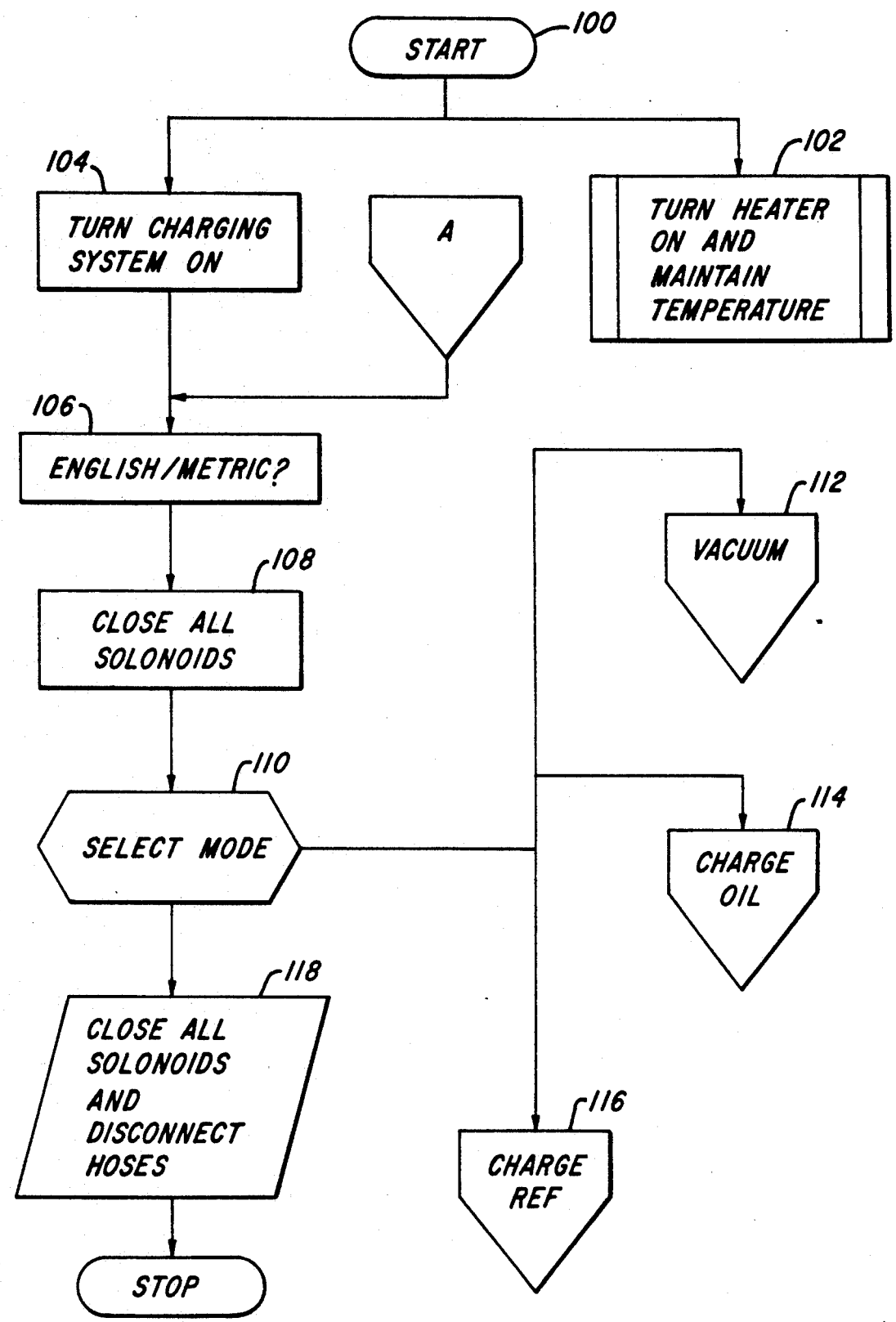
FIG. 4 is a high level logical flow chart of a program for a data processing system which may be utilized to implement the method and system of the present invention.

FIG. 3 is a schematic illustration of refrigeration servicing apparatus 10 Apparatus 10 may be connected by hoses to a refrigeration system 24, such as may be found in an automobile, for cleaning, testing and recharging of the refrigeration system. Refrigeration system 24 will be understood to include conventional heat transfer systems comprising a compressor and two sets of heat exchangers. Cleaning occurs during a vacuum mode during which refrigeration system 24 is evacuated to vaporize impurities, such as water, which may have invaded the system. Testing occurs during either type of recharging mode, that of refrigerant or that for lubricating oil, or during the vacuum mode. Input/output interface 16 is connected to a controller 22 which controls and evaluates the results of serial application of the three modes of operation of servicing apparatus 10.

Controller 22 includes a microcomputer for the execution of processes supporting each mode of operation of servicing apparatus 10. It further includes analog to digital conversion circuitry for handling analog data produced by scale 26, temperature transmitters 28 and 30, and pressure transducer 32. Outputs from digital controller 22 may be used to switch power sources as appropriate to turn on heater 34, to turn on vacuum pump 36, or to activate one of three solenoid actuated valves 38, 40 or 42. Suitable displays and controllers include the Universal Electronic Controller, available from Mallory Controls, 2831 Waterfront Parkway East Drive, Indianapolis, Indiana.

Solenoid actuated valve 38 is disposed in a fluid transfer line 44 connected between vacuum pump 36 and a connecting port 45. Where refrigeration system 24 is connected to connecting port 45 by a hose 56, pump 36 may be turned on and valve 38 opened to evacuate refrigeration system 24 and thereby vaporize and remove residue impurities. This occurs during the vacuum mode.

Solenoid actuated valve 40 is disposed in fluid transfer line 46 connecting a refrigerant vessel 50 and a connecting port 47. Refrigerant held in vessel 50 is typically pressurized before transfer to refrigeration system 24 by heating the refrigerant in the vessel to 150° F. After pressurization, refrigerant is transferred from vessel 50 to refrigeration system 24 by opening valve 40, thereby allowing material to flow from vessel 50 through line 46 to connecting port 47 and from there through hose 57 into a partially evacuated refrigeration system 24.

Solenoid actuated valve is disposed in fluid transfer line 48 connecting a lubricating oil vessel 52 and connecting port 47. Lubricant held in vessel 50 is typically pressurized before transfer to refrigeration system 24 by heating the lubricant in the vessel to 150° F. After pressurization, lubricant is transferred from vessel 52 to refrigeration system 24 by opening valve 42 allowing material to flow from vessel 52 through line 48 to connecting port 47 and there through hose 57 into an evacuated refrigeration system 24.

Refrigerant vessel 50 and lubricating oil vessel 52 are supported within a thermally insulated container 54. A heater 34, which is controlled from digital controller 22 is also mounted within container 54 to maintain the temperature of the contents of the two vessels at 150° F., as measured by temperature sending units 28 and 30. The weight of container 54 and the vessels are supported on a scale 26. Data from scale 26 is transmitted to digital controller 22 for use in controlling the periods for which valves 40 and 42 are opened and for certain error condition determinations.

FIGS. 4–7 are logical flow charts of high level block diagrams of software or microcode implementations for a data processing system incorporating the system and method of the present invention. The processes are entered at block 100, whereupon a processing fork occurs, one branch leading to block 102 and the second leading to block 104. Block 102 relates to a subprocess which turns heater 34 on and off to maintain the temperature of the both the lubricating oil vessel 52 and the refrigerant vessel 50 at 150° F. Heater 34 may be divided into separate lubricating oil and refrigerant heating elements.

Block 104 relates to initialization of digital controller 22 including activation of input/output interface 16. The service technician is prompted to select English or metric units at block 106 Next, at block 108 all solenoid actuated valves are signalled to close. At block 110 the user is prompted to select a mode of operation: i.e. vacuum mode (following connector 112); lubricating oil charging mode (following connector 114); and refrigerant charging mode (following connector 116). Subsequent to execution of the selected mode processing continues in that mode until completion or a fault. The process is returned to block 110 for selection of the next mode or reselection of the mode where a fault occurred if correction has proven possible. Block 110 also allows discontinuance of servicing by advancing the process to block 118, which provides for signalling all solenoid actuated valves to close and signals the user to disconnect all hoses to a refrigeration system being recharged. The process than discontinues.

Figure 5A:
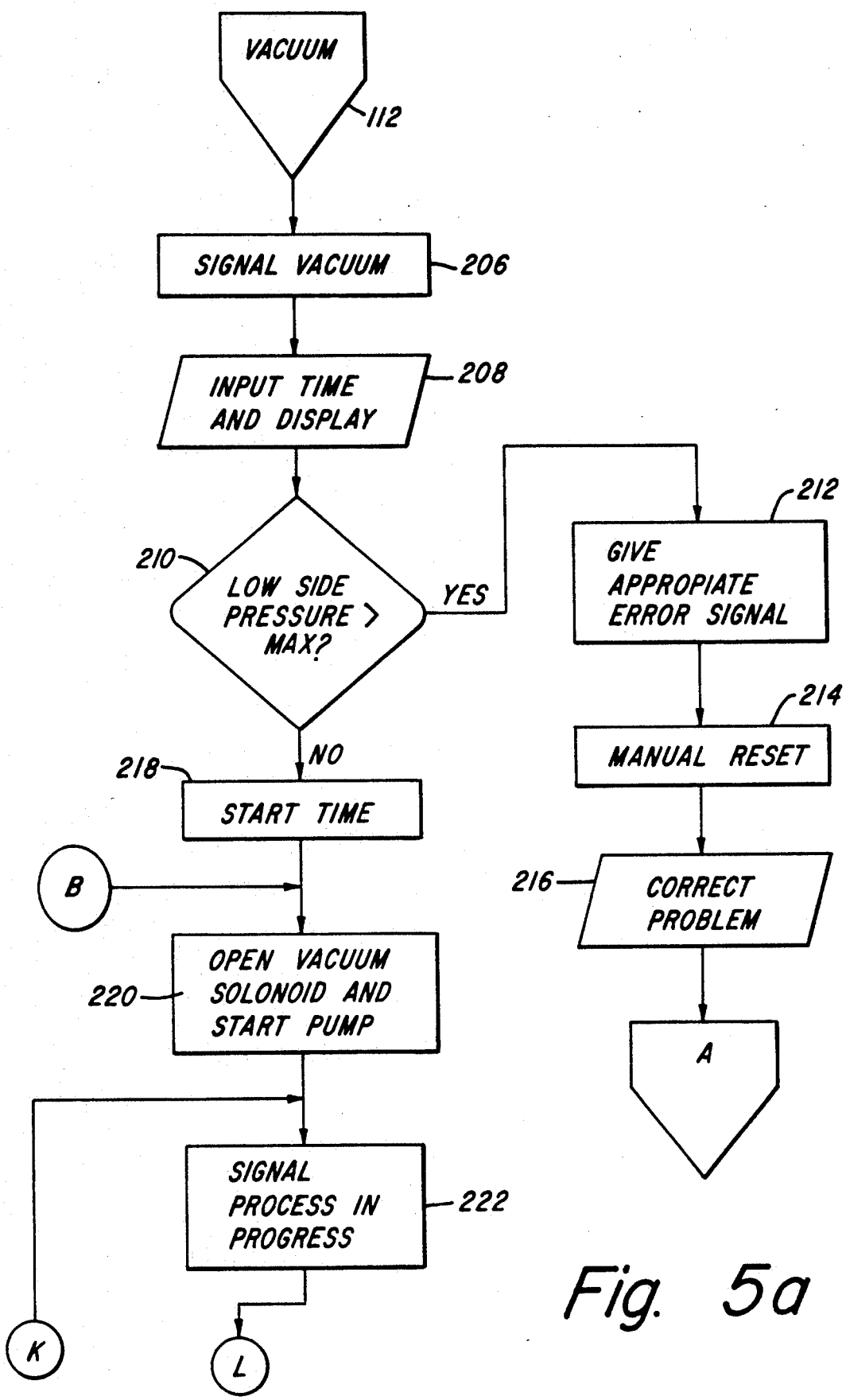
FIG. 5 is a high level logical flow chart of a program for a data processing system which may be utilized to implement the method and system of the present invention.
Figure 5B:
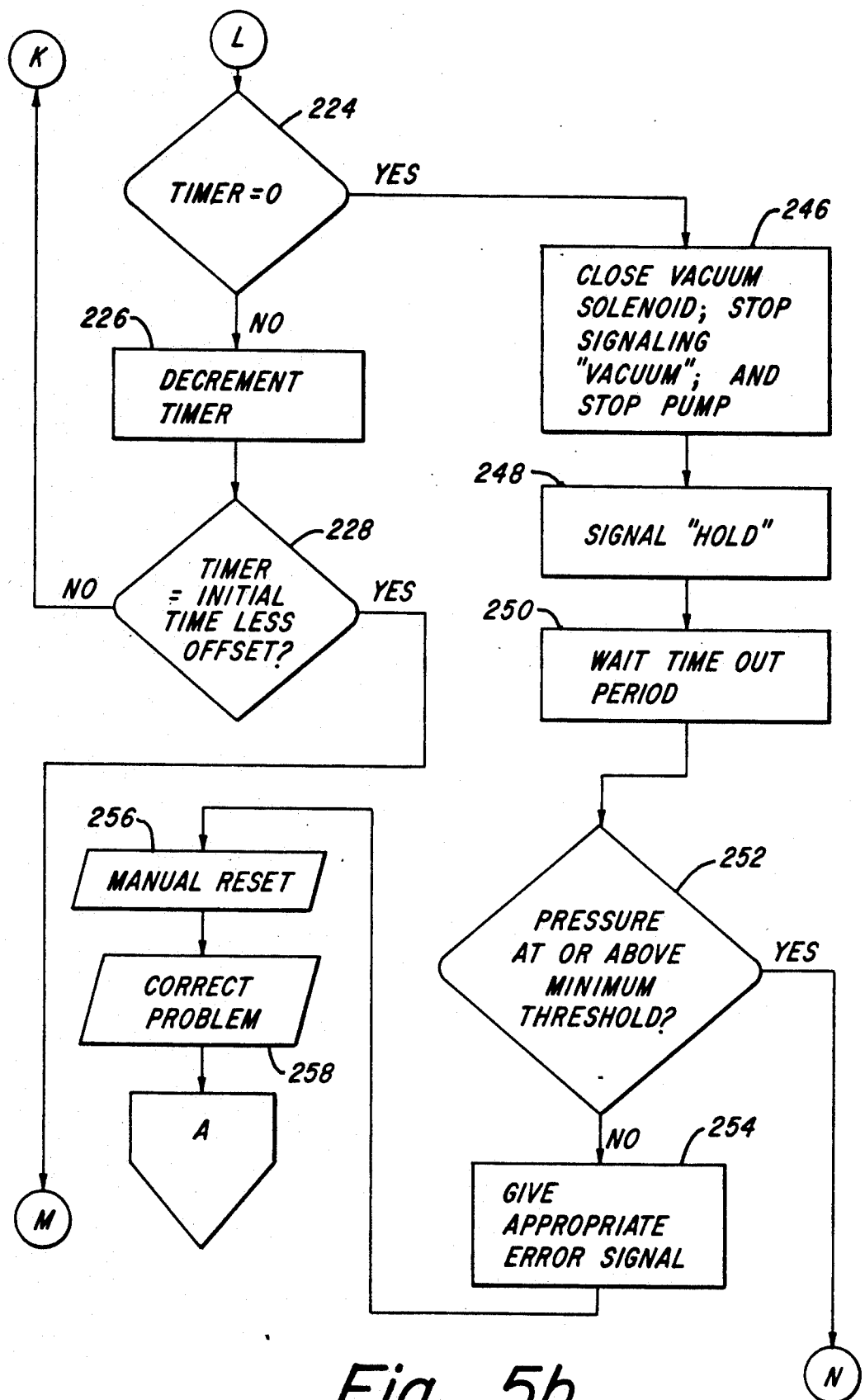
Figure 5C:
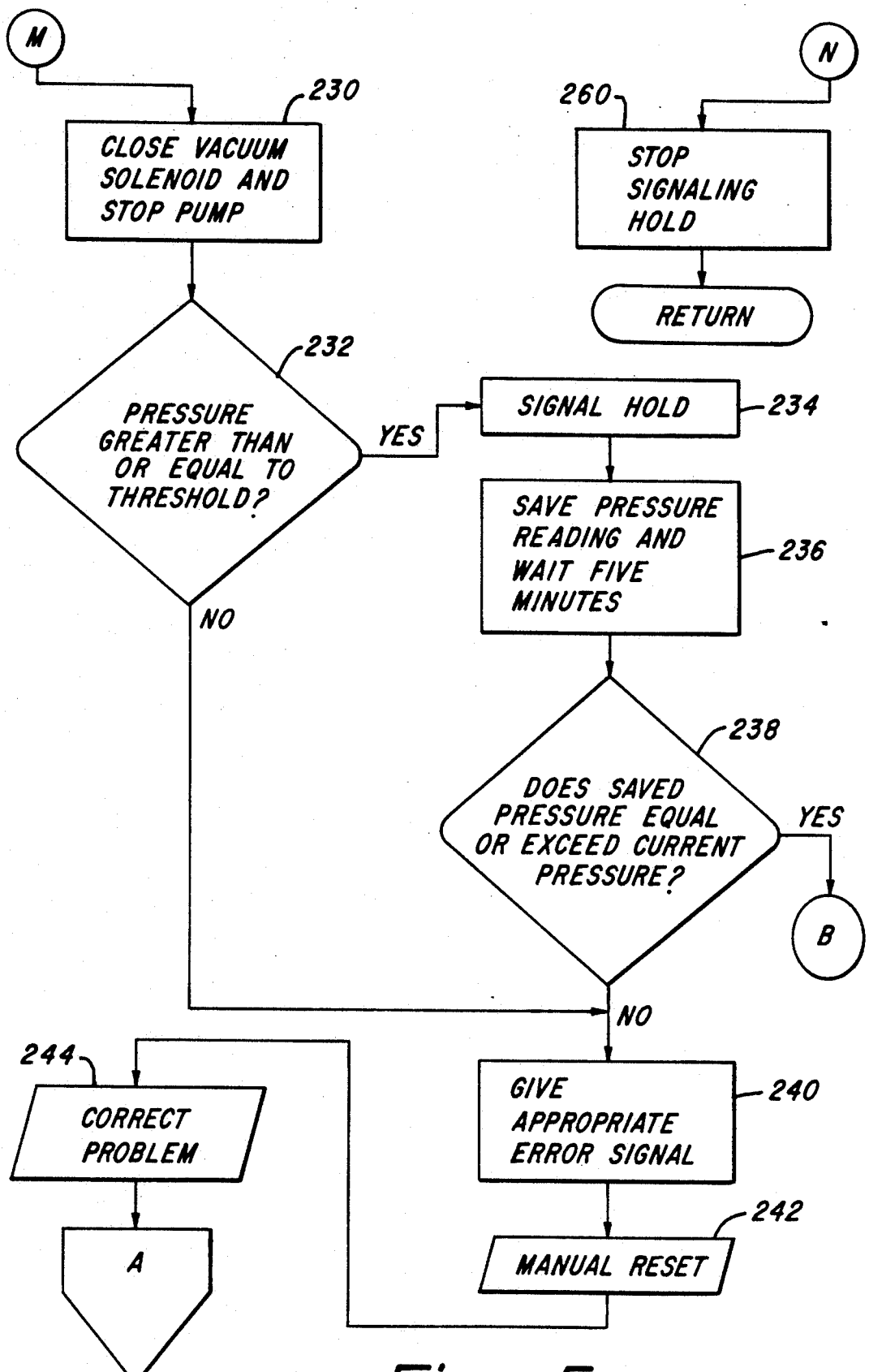

FIG. 5 continues the process in vacuum mode entered by connector 112. Vacuum mode is used to evacuate a refrigeration system of any volatile impurities which may be present. For example, the boiling point of water drops as air pressure drops. By applying a vacuum to a refrigeration system, any water in the system is boiled away and removed. The vacuum mode is initiated with execution of the operations of blocks 206 and 208, which result in generation of a signal on the display of input/output interface 16 indicating that the vacuum mode has been entered, and of a second signal indicating that a timer input is required from the operator. The timer input is used to time the duration of application of a vacuum to the refrigeration system. Upon receipt of a input time the remaining time in the mode may be displayed, with periodic update.

Next, with execution of block 210, the process determines whether the refrigeration system undergoing servicing is still pressurized, by determining if pressure in the refrigeration system exceeds a maximum limit, here 25 p.s.i.g. A refrigeration system should be drained of refrigerant prior to application of vacuum, both to recover the refrigerant and to avoid its being pumped to the atmosphere by vacuum pump 36. An over maximum result of the test of block 210 may indicate that the refrigeration system has not been drained. Thus the YES branch from block 210 leads to execution of block 212, which results in generation of a coded error signal indicating to the user to check for that as well as other possible problems. Process execution is held in abeyance until the user depresses a reset button (detected at block 214). Block 216 is used to indicate user actions directed to correction of the problem causing the over pressure condition. The process is returned the base process at block 106.

If initial pressure in the refrigeration system falls below the maximum permitted level the vacuum mode is initiated. Block 218 indicates the beginning of the timer countdown. Next, with execution of block 220 vacuum pump 36 is started and valve 38 is opened to allow material drawn from the refrigeration system to be exhausted to the atmosphere. With execution of block 222 the user is advised by that pumping is underway. Next, at decision block 224, it is determined whether the process has timed out. If not, block 226 is executed to decrement the timer.

One of a plurality of system integrity tests is performed during vacuum mode. The timing of the test is controlled by block 228, which determines if the elapsed time from the beginning of the vacuum mode strictly equals an offset time selected as the moment to conduct the first integrity test. Where the offset time has not been reached, or after it has been passed, the NO branch from block 228 loops the process back to block 222. The first integrity test is initiated at block 230 by stopping the vacuum pump and by closing valve 38. A near vacuum should have been established in the refrigeration system, which is determined at block 232 where atmospheric pressure is compared to refrigeration system pressure. If atmospheric pressure exceeds refrigeration system pressure by an amount that is equal to or greater than 28 inches of mercury, an adequate vacuum is deemed to have been established and the second phase of the test may be conducted (the YES branch from block 232). The NO branch indicates a problem situation.

The YES branch from block 232 advances the process to block 234 to begin the second aspect of the first integrity test. A "HOLD" signal is displayed on interface 16 (block 234). With execution of block 236 the current pressure is saved and a five minute wait occurs. At the conclusion of the five minute wait the pressure reading saved at the beginning of the five minute period is compared to a new current reading. If the earlier reading is equal to (within a small margin of error) or exceeds the new reading the refrigeration system is judged to have satisfactory integrity and the vacuum mode is continued by return of the process to block 220 to resume pumping.

If the system fails either the first or second parts of the integrity test, block 240 is executed to provide the user technician with the appropriate error code. Further processing is held in abeyance until the user manually resets (block 242) the system. Block 244 indicates user actions to correct the situation causing indication of the problem.

The NO branch from block 224 reflects timing out of the vacuum mode after successful completion first integrity test. With execution of block 246 valve 38 is closed, pump 36 is shut off and the "VACUUM" signal is removed from interface 16. Next, with execution of blocks 248 and 250 a "HOLD" signal is generated and a two minute wait executed. The two minute wait is done to carry out a second system integrity test. At the conclusion of the HOLD period, atmospheric pressure is compared to the refrigeration system pressure. If atmospheric pressure exceeds refrigeration system pressure by 25 inches of mercury the system is passed. The "HOLD" signal is removed (block 260) and the process is returned to block 110 for selection of the next operational mode.

Where the system fails this final integrity test it is treated like a failure of the first test. Blocks 254, 256 and 258 which duplicate the steps of blocks 240, 242 and 244 are executed to give the error condition and to prompt correction of the problem.

Figure 6A:
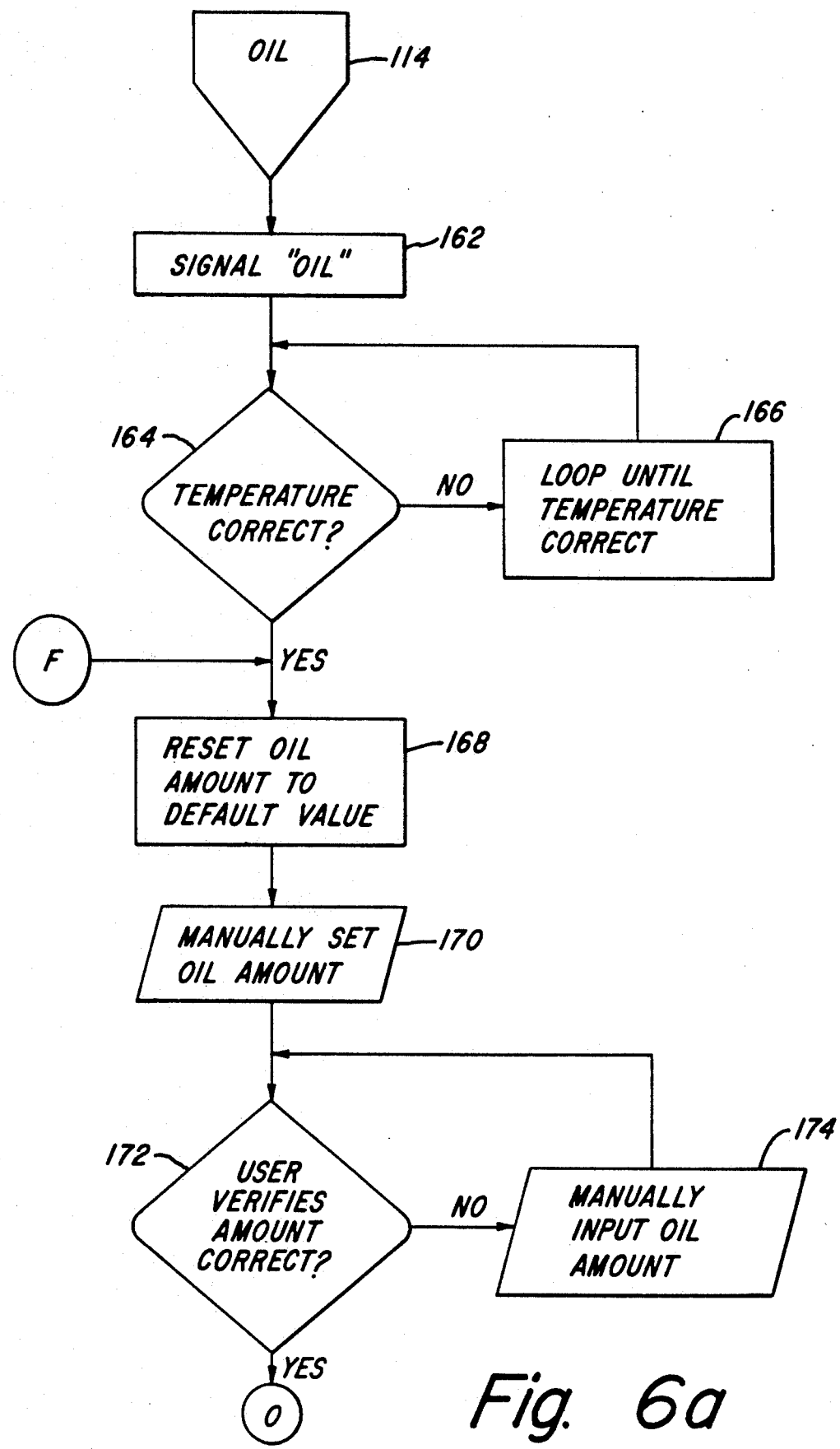
FIG. 6 is a high level logical flow chart of a program for a data processing system which may be utilized to implement the method and system of the present invention.
Figure 6B:
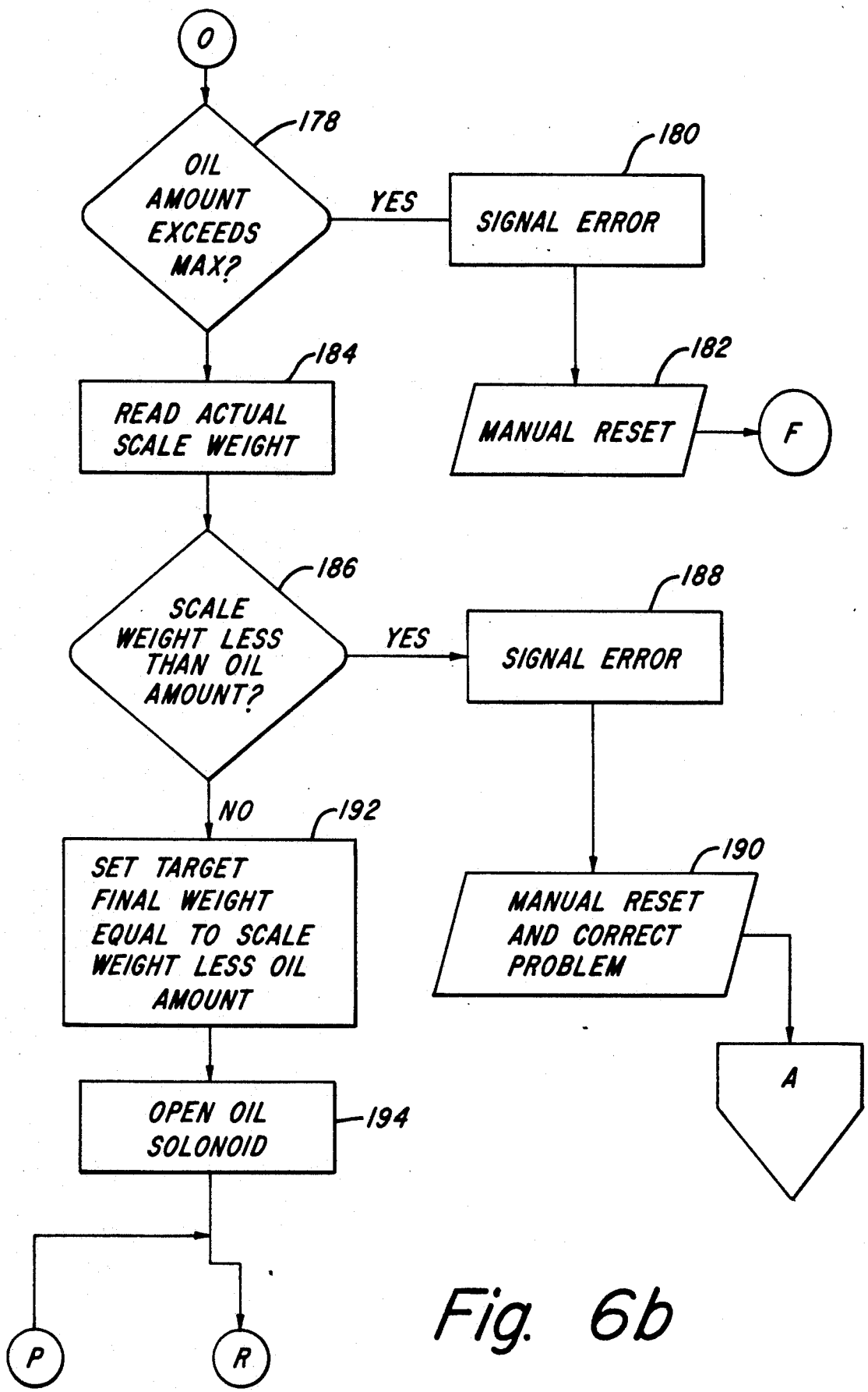
Figure 6C:
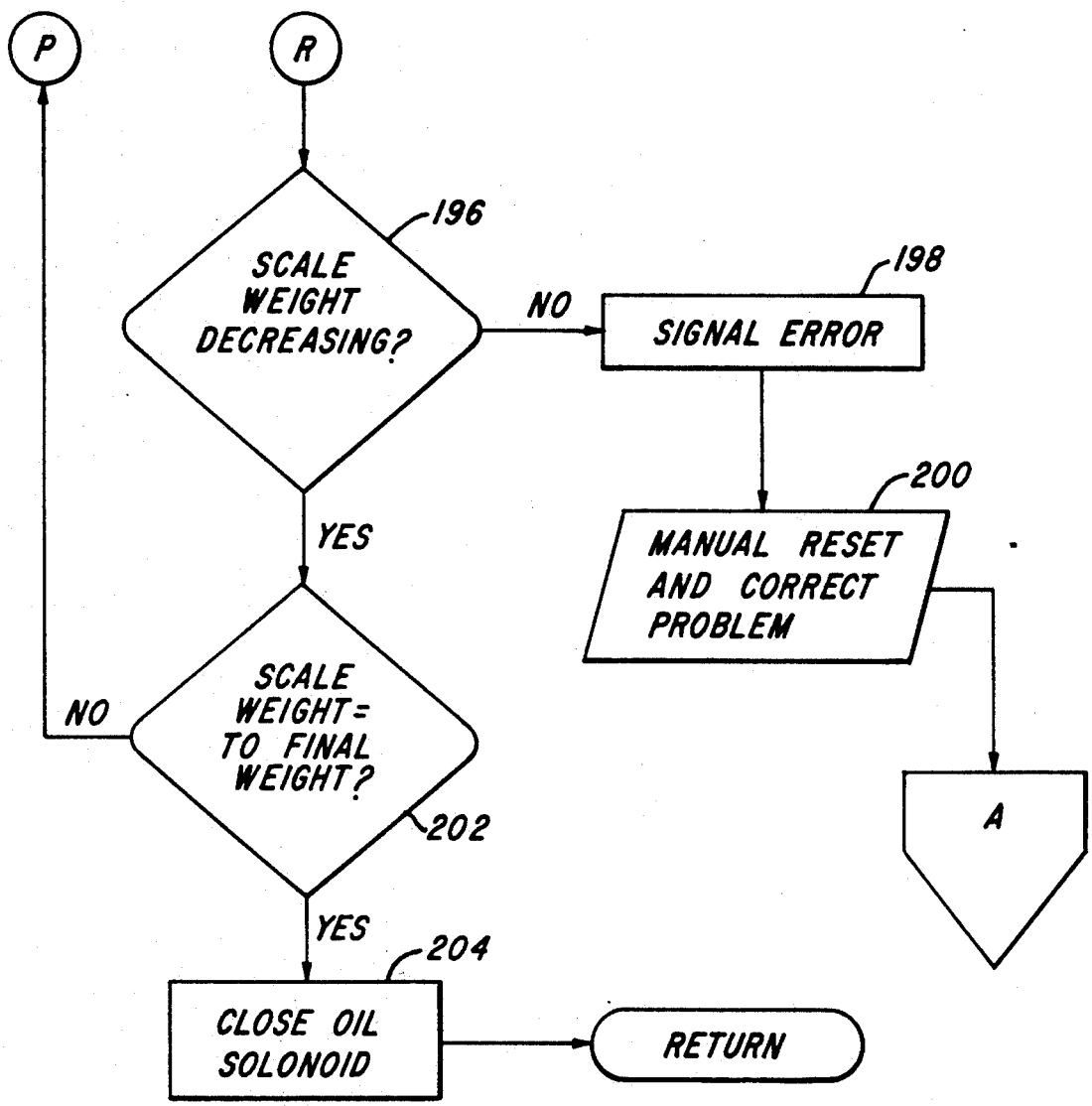

FIG. 6 is a logical flow chart illustrating a software or microcode implementation of an oil charging process in accordance with the teachings of the present invention. The lubricating oil charging mode is entered through connector 114 after selection of the mode from block 110. With execution of block 162 the process generates a signal on interface 16 that the oil charging mode has been entered. Many refrigeration systems do not have independent lubricating systems within the closed cycle of the compression and decompression systems. Therefore a lubricating oil is inserted into the cycle, preferably before the refrigerant. The net quantity of oil will generally be considerably less than the quantity of refrigerant. The oil is pressurized by the refrigerant charge and by heating the oil in its storage vessel 52. The process is not allowed to proceed until the oil temperature is high enough (blocks 164 and 166). A default value (usually five ounces) for the quantity of oil to inject into the refrigeration system is displayed to the user (block 168). The user can reset the default values (block 170) by togging the appropriate control buttons on interface 16 to increase or decrease the amount. Block 172 calls for a user decision that the desired value has been entered. If the user decides that it has not, the process branches to block 174 to allow further adjustment of the value. A maximum of 20 ounces of oil may be selected. If the selected amount is excessive, execution of block 178 detects it and indicates the error to the user (block 180). After a manual reset (block 182) the process is returned to block 168 to reinitiate selection of a quantity of oil for injection to the system. Thus any newly selected value is also evaluated for reasonableness.

Next, with execution of block 184 the weight of oil available on scale 26 is determined. The number will be used to control the quantity of oil available for transferred to the refrigeration system. If at block 186 it is determined that insufficient oil is available, an error is signalled (block 188). Block 190 indicates user actions to correct the problems, typically by adding oil to the pressurization vessel 52.

Where sufficient oil is available, block 192 is executed to set a final target weight equal to the initial scale weight less the quantity selected for transfer into the refrigeration system. Next, with execution of block 194, valve 42 is opened allowing oil to flow from vessel 52 into refrigeration system 24. Both the absolute value of weight on scale 26 (block 202) and the rate of change of the weight (block 196) are monitored for control purposes. If scale weight is not decreasing after valve 42 has been opened, a error condition exists which is signaled at block 198. Block 200 reflects resultant user actions to correct the problem and to reset the process. Once transfer of the appropriate quantity of oil is detected (block 202), valve 42 is closed (block and the process is returned to block 100.

Figure 7A:
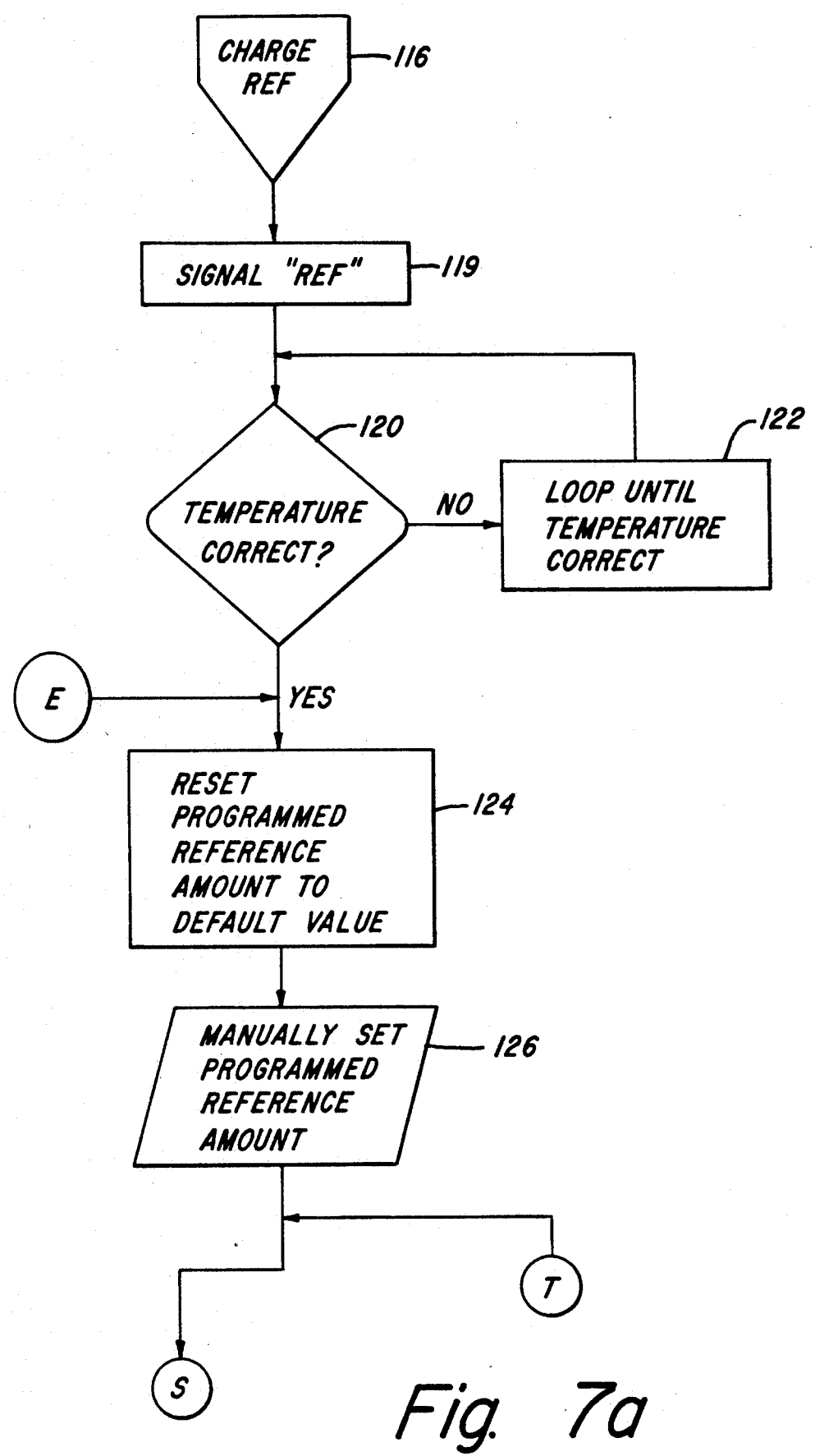
FIG. 7 is a high level logical flow chart of a program for a data processing system which may be utilized to implement the method and system of the present invention.
Figure 7B:
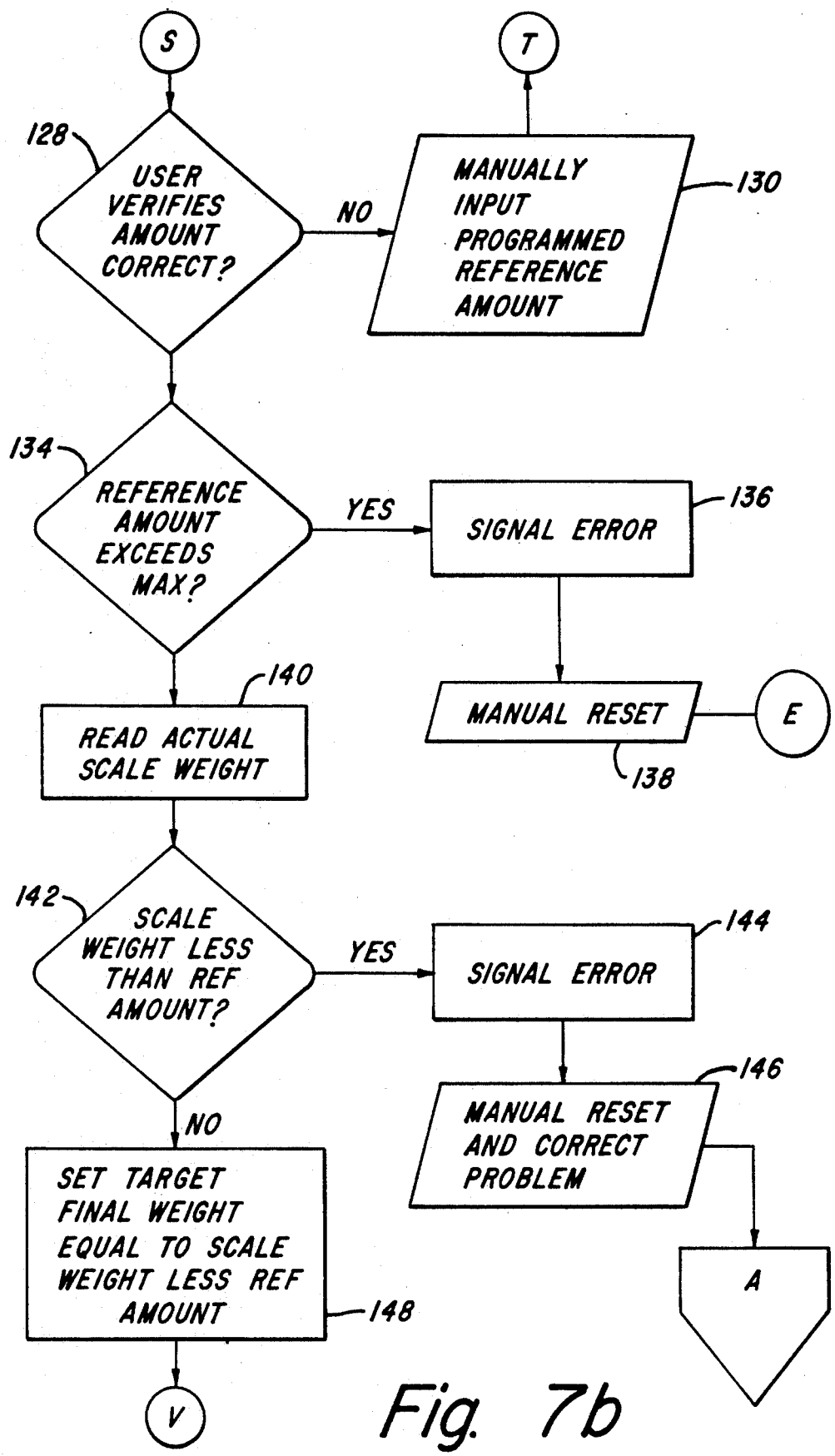
Figure 7C:
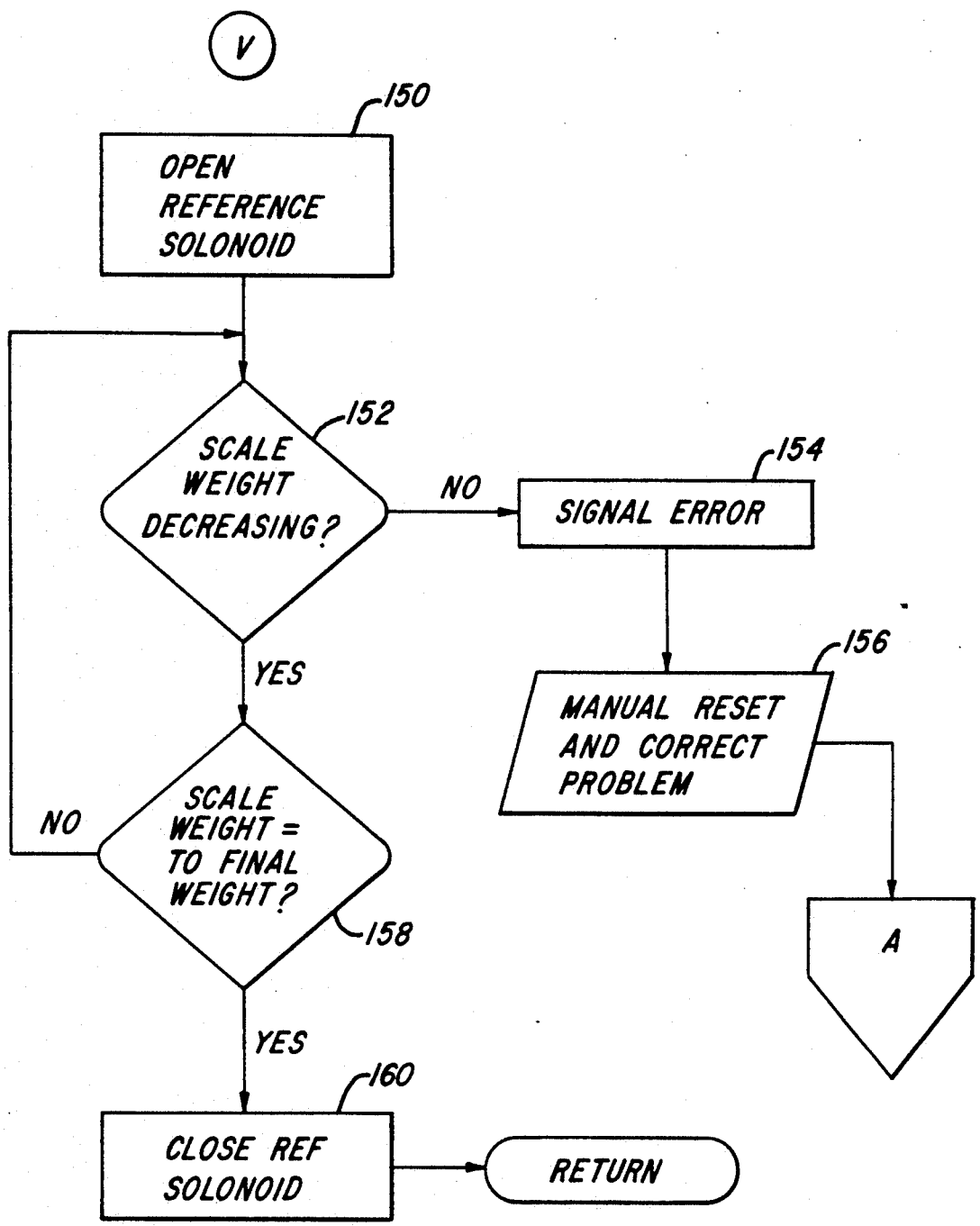

FIG. 7 is a logical flow chart illustrating a software or microcode implementation of an refrigerant charging process in accordance with the teachings of the present invention. The refrigerant charging mode is entered through connector 116 after selection of the mode from block 110. With execution of block 119 the process generates a signal on interface 16 that the refrigerant charging mode has been entered. The refrigerant is volatile and is pressurized by heating its storage vessel 50. The process is not allowed to proceed until the refrigerant temperature exceeds a predetermined minimum (blocks 120 and 122). A default value (usually 32 ounces) for the quantity of refrigerant to inject into the refrigeration system is recovered and displayed to the user (block 124). The user can reset from the default value (block 126) by toggling the appropriate control button on interface 16. Block 128 calls for a user decision that the desired value has been entered. If the user decides that the desired value has not been entered, the process branches to block 130 to allow further adjustment of the value.

A maximum of 480 ounces of refrigerant is permitted. If the selected amount is excessive, execution of block 134 detects that fact and indicates the error to the user (block 136). After a manual reset (block 138) the process is returned to block 124 to reinitiate selection of a quantity of refrigerant for injection to the system. Thus any newly selected value is also evaluated for reasonableness.

After a qualified quantity has been selected, with execution of block 140 the weight of refrigerant available on scale 26 is determined. The number will be used to control the quantity of refrigerant available for transferred to the refrigeration system. If at block 142 it is determined that insufficient refrigerant is available, an error is signalled (block 144). Block 146 indicates user actions to correct the problems, typically by adding refrigerant to the pressurization vessel 52.

Where sufficient refrigerant is available, block 148 is executed to set a final target weight equal to the initial scale weight less the quantity selected for transfer into the refrigeration system. Next, with execution of block 150 valve 40 is opened allowing refrigerant to flow from vessel 50 into refrigeration system 24. Both the absolute value of weight on scale 26 (block 158) and the rate of change of the weight (block 152) are monitored for control purposes. If scale weight is not decreasing after valve 40 has been opened, a error condition exists which is signaled at block 154. Block 156 reflects resultant user actions to correct the problem and to reset the process. Once transfer of the appropriate quantity of refrigerant is detected (block 158), valve 40 is closed (block 160) and the process is returned to block 110.

While the invention has been particularly shown and described with reference to a preferred embodiment, it will be understood by those skilled in the art that various changes in form and detail may be made therein without departing from the spirit and scope of the invention.

What is claimed is:

1. A refrigeration system servicing apparatus comprises:
   a digital controller;
   a vacuum source;
   an outlet valve responsive to the digital controller for actuation to connect the vacuum source to a refrigeration system;
   a pressure sensor for providing pressure readings to the digital controller from a refrigeration system;
   means responsive to user selection for initiating a vacuum mode for undergoing servicing by first determining from the pressure sensor that the refrigeration system is not substantially pressurized over ambient pressure and by setting a time out period;
   means for opening the outlet valve for an offset period;
   timer means responsive to expiration of the offset period for closing the outlet valve and determining if a substantial vacuum has been established in the refrigeration system;
   means responsive to establishment of a substantial vacuum for determining if the refrigeration system retains the substantial vacuum for a first hold period;
   means responsive to expiration of the first hold period and retention of the substantial vacuum by the refrigeration system for opening the outlet valve;
   means responsive to expiration of the time out period for closing the outlet valve and for determining if the refrigeration system retains a substantial vacuum for a second hold period;
   means for recharging a refrigeration system after completion of the vacuum mode; and
   means responsive to failure to establish or hold a substantial vacuum for signalling an error condition to an operator.

2. A refrigeration system servicing apparatus as set forth in claim 1, wherein the means for recharging a refrigeration system include:
   a vessel for pressurizing refrigerant;
   an inlet valve controlled by the digital controller connected between the refrigerant vessel and a port for connection to a refrigeration system;
   means for measuring change sin quantity of refrigerant in the vessel;
   a vessel for pressurizing lubricating oil; and
   a second inlet valve controlled by the digital controller and connected between the lubricating oil pressurizing vessel and an outlet port for a refrigeration system for controlling transfer of lubricating oil from the lubricating oil pressurizing vessel to the refrigeration system.

3. A refrigeration system servicing apparatus as set forth in claim 2 and further comprising:
   means for determining changes in quantity of oil in the oil pressurization vessel.

4. A refrigeration system servicing apparatus as set forth in claim 3 and further comprising:
   means responsive to user selection for initiating an oil charging mode by actuation of the valve connecting the refrigeration system to the oil pressurization vessel; and
   means responsive to user selection for initiating a refrigerant charging mode by actuation of the valve connecting the refrigeration system to the refrigerant pressurization vessel.

5. A refrigeration system servicing apparatus as set forth in claim 4, and further comprising:
   a user input/output interface connected to the digital controller including a non-numeric keypad for selection of quantities and operational modes.

6. A refrigeration system servicing apparatus as set forth in claim 5 wherein the user input/output interface includes means for displaying default quantities of oil and refrigerant for transfer to a refrigeration system and the non-numeric keypad allows for adjusting incrementally from the default quantities.

7. A refrigeration system servicing apparatus as set forth in claim 6 and further comprising:
   means for pressurizing the oil and refrigerant in the vessels by heating the vessels.

8. A method of servicing a refrigeration system comprising the steps of:

responsive to user selection, determining from a pressure sensor that a refrigeration system is not substantially pressurized over ambient pressure;

if the refrigeration system is not substantially pressurized, beginning evacuation of the refrigeration system;

timing expiration of an offset period and then discontinuing evacuation, determining if a substantial vacuum has been established in the refrigeration system;

responsive to establishment of a substantial vacuum, determining if the refrigeration system retains the substantial vacuum for a first hold period;

responsive to retention of the substantial vacuum by the refrigeration system for the first hold period, resuming evacuation of the refrigeration system;

after expiration of a predetermined time period, stopping evacuation of the refrigeration system and determining if the refrigeration system retains a substantial vacuum for a second hold period;

responsive to successful retention of the substantial vacuum for the second hold period, recharging the refrigeration system; and responsive to failure to establish or hold a substantial vacuum in any of the preceding steps, signalling an error condition.

* * * * *